US009344675B1

(12) United States Patent
Chord et al.

(10) Patent No.: US 9,344,675 B1
(45) Date of Patent: May 17, 2016

(54) DYNAMIC NOTIFICATION TECHNIQUES FOR VIDEO CHAT INVITATIONS

(71) Applicant: Google Inc., Mountain View, CA (US)

(72) Inventors: Jordanna Chord, Kenmore, WA (US); Brian David Marsh, Seattle, WA (US); Kevin Brown, Kirkland, WA (US); Per Johan Gustafsson, Stockholm (SE); Jacualyn Carol Bonnell, Woodinville, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/456,720

(22) Filed: Aug. 11, 2014

(51) Int. Cl.
*H04N 7/14* (2006.01)
*H04N 7/15* (2006.01)
*H04M 3/42* (2006.01)

(52) U.S. Cl.
CPC ................ *H04N 7/147* (2013.01); *H04N 7/15* (2013.01); *H04M 3/42042* (2013.01)

(58) Field of Classification Search
None
See application file for complete search history.

(56) References Cited

U.S. PATENT DOCUMENTS 8,606,306 B2 12/2013 Santamaria et al.
8,621,585 B2 12/2013 Danieli et al.
2001/0030664 A1 10/2001 Shulman et al.
2003/0195937 A1* 10/2003 Kircher et al. ................ 709/207
2004/0127198 A1 7/2004 Roskind et al.
2005/0030977 A1* 2/2005 Casey et al. ................... 370/485
2011/0314064 A1 12/2011 Jeyaseelan et al.
2011/0320235 A1* 12/2011 Bak et al. ..................... 705/7.19
2012/0150966 A1* 6/2012 Fan et al. ...................... 709/206
2013/0027504 A1* 1/2013 Zhang ........................ 348/14.08
2013/0304616 A1* 11/2013 Raleigh et al. .................. 705/34
2013/0342635 A1 12/2013 Yurchenko
2014/0025740 A1* 1/2014 Jaudon et al. ................ 709/204

FOREIGN PATENT DOCUMENTS

WO 2014021546 A1 2/2014

OTHER PUBLICATIONS

Rqna, "Get Notification on Video Chat Invitation," Copyright 2011-2014, http://www.rqna.net/qna/xnsvv-get-notification-on-video-chat-invitation.html, 1 page.

* cited by examiner

*Primary Examiner* — Fan Tsang
*Assistant Examiner* — Jeffrey Lytle
(74) *Attorney, Agent, or Firm* — Remarck Law Group PLC

(57) ABSTRACT

A computer-implemented technique can include receiving a video chat request to initiate a video chat with at least one invitee user. The technique can include for a specific invitee user, determining a degree of notification for a specific video chat invitation for the specific invitee user, the degree of notification comprising a notification medium and a notification level each having a degree of intrusiveness, wherein determining the degree of notification is based on: (a) a number of invitee users specified by the video chat request, and (b) video chat attributes of the specific invitee user. The technique can also include outputting the specific video chat invitation to an invitee computing device associated with the specific invitee user via the determined notification medium, wherein receipt of the specific video chat invitation causes the invitee computing device to notify the specific invitee user according to the determined notification level.

20 Claims, 2 Drawing Sheets

300
Start
304
Video Chat Request Received?
N
Y
308
Determine Notification Mediums for Delivering Video Chat Invitations
312
Determine Notification Levels for Video Chat Invitations
316
Transmit Video Chat Invitations Via Respective Notification Mediums
End

DYNAMIC NOTIFICATION TECHNIQUES FOR VIDEO CHAT INVITATIONS

FIELD

The present disclosure generally relates to video chat and, more particularly, to dynamic notification techniques for video chat invitations.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A video chat session can be initiated by at least one inviter user, such as in response to a video chat request provided to a server from an inviter computing device. This video chat request can specify specific invitee users that the inviter user (s) would like to invite to the video chat session. Conventional systems merely notify each invitee user of the video chat invitation similar to a conventional telephone call, e.g., a ringing notification. These notifications, however, provide no additional information to each invitee user as to the details of the video chat session they are being invited to participate in.

SUMMARY

A computer-implemented technique is presented. The technique can include receiving, at a server from an inviter computing device associated with an inviter user, the server having one or more processors, a video chat request to initiate a video chat with at least one invitee user. The technique can include for a specific invitee user, determining, at the server, a notification medium and a notification level for a specific video chat invitation for the specific invitee user based on: (i) a type of the specific invitee computing device, (ii) a comparison of a number of invitee users specified by the video chat request to thresholds corresponding to different notification mediums and levels, and (iii) video chat attributes of the specific invitee user, the notification level defining at least one of audio and visual levels, wherein the video chat attributes include at least one of: (a) a muted or blocked status for the inviter user, (b) a connection with the inviter user at a social network, (c) a logged in/out status for an account, (d) a snooze or do not bother status. The technique can also include outputting, from the server, the specific video chat invitation to the specific invitee computing device via the determined notification medium, wherein receipt of the specific video chat invitation causes the specific invitee computing device to notify the specific invitee user according to the determined notification level.

Another computer-implemented technique is also presented. The technique can include receiving, at a server from an inviter computing device associated with an inviter user, the server having one or more processors, a video chat request to initiate a video chat with at least one invitee user. The technique can include for a specific invitee user, determining, at the server, a degree of notification for a specific video chat invitation for the specific invitee user, the degree of notification comprising a notification medium and a notification level each having a degree of intrusiveness, wherein determining the degree of notification is based on: (a) a number of invitee users specified by the video chat request, and (b) video chat attributes of the specific invitee user, each video chat attribute being indicative of an expected degree of notification. The technique can also include outputting, from the server, the specific video chat invitation to an invitee computing device associated with the specific invitee user via the determined notification medium, wherein receipt of the specific video chat invitation causes the invitee computing device to notify the specific invitee user according to the determined notification level.

In some embodiments, the notification medium includes, from highest to lowest degree of intrusiveness, at least one of: (i) a sound command, (ii) a message via at least one of a video chat application and a system tray, (iii) a social network stream, and (iv) at least one of an email and a text message. In some embodiments, the notification medium always includes at least the social network stream.

In some embodiments, determining the degree of notification further comprises: comparing, at the server, the number of invitee users specified by the video chat request to thresholds for different degrees of intrusiveness, and determining, at the server, the degree of notification based further on the comparing, wherein a higher degree of notification corresponds to a smaller numbers of invitee users.

In some embodiments, the notification level comprises at least one of an audio level and a visual level for the specific video chat invitation, and a higher degree of notification is indicative of higher audio and visual levels. In some embodiments, the video chat attributes of the specific invitee user include a muted or blocked status for the inviter user, wherein the muted of blocked status is indicative of a lesser degree of notification.

In some embodiments, the video chat attributes of the specific invitee user include a logged in/out status for an account, wherein the logged in status is indicative of a higher degree of notification and the logged out status is indicative of a lesser degree of notification. In some embodiments, the video chat attributes of the specific invitee user include a connection with the inviter user at a social network, wherein the connection with the inviter user is indicative of a higher degree of notification.

In some embodiments, at least some of the video chat attributes of the specific invitee user are determined using a calendar associated with the specific invitee user. In some embodiments, wherein the video chat attributes of the specific invitee user include a snooze or do not bother status determined using the calendar associated with the specific invitee user, wherein the snooze or do not bother status is indicative of a lesser degree of notification.

A server having one or more processors configured to perform operations is also presented. The operations can include receiving, from an inviter computing device associated with an inviter user, a video chat request to initiate a video chat with at least one invitee user. The operations can include for a specific invitee user, determining a degree of notification for a specific video chat invitation for the specific invitee user, the degree of notification comprising a notification medium and a notification level each having a degree of intrusiveness, wherein determining the degree of notification is based on: (a) a number of invitee users specified by the video chat request, and (b) video chat attributes of the specific invitee user, each video chat attribute being indicative of an expected degree of notification. The operations can also include outputting the specific video chat invitation to an invitee computing device associated with the specific invitee user via the determined notification medium, wherein receipt of the specific video chat invitation causes the invitee computing device to notify the specific invitee user according to the determined notification level.

In some embodiments, the notification medium includes, from highest to lowest degree of intrusiveness, at least one of: (i) a sound command, (ii) a message via at least one of a video chat application and a system tray, (iii) a social network stream, (iv) at least one of an email and a text message. In some embodiments, the notification medium always includes at least the social network stream.

In some embodiments, determining the degree of notification further comprises: comparing the number of invitee users specified by the video chat request to thresholds for different degrees of intrusiveness, and determining the degree of notification based further on the comparing, wherein a higher degree of notification corresponds to a lower numbers of invitee users.

In some embodiments, the notification level comprises at least one of an audio level and a visual level for the specific video chat invitation, and a higher degree of notification is indicative of higher audio and visual levels. In some embodiments, the video chat attributes of the specific invitee user include a muted or blocked status for the inviter user, wherein the muted of blocked status is indicative of a lesser degree of notification.

In some embodiments, the video chat attributes of the specific invitee user include a logged in/out status for an account, wherein the logged in status is indicative of a higher degree of notification and the logged out status is indicative of a lesser degree of notification. In some embodiments, the video chat attributes of the specific invitee user include a connection with the inviter user at a social network, wherein the connection with the inviter user is indicative of a higher degree of notification.

In some embodiments, at least some of the video chat attributes of the specific invitee user are determined using a calendar associated with the specific invitee user, and the video chat attributes of the specific invitee user include a snooze or do not bother status determined using the calendar associated with the specific invitee user, wherein the snooze or do not bother status is indicative of a lesser degree of notification.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
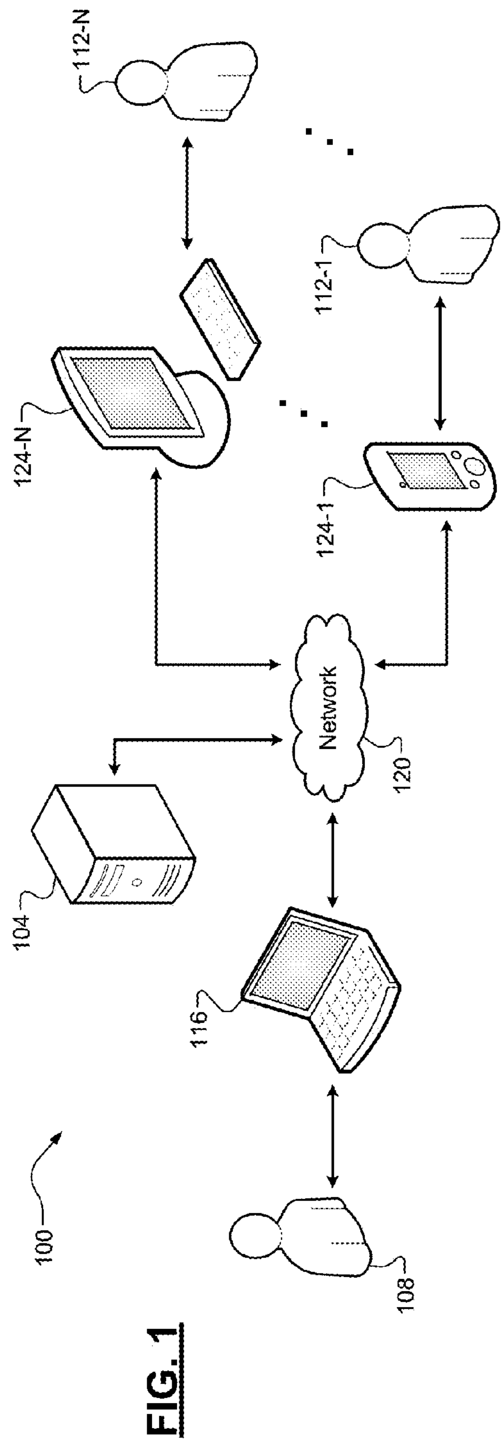
FIG. 1 is a diagram of a computing network including an example server according to some implementations of the present disclosure.

As previously mentioned, conventional systems merely notify each invitee user of the video chat invitation similar to a conventional telephone call, e.g., a ringing notification. Some video chat sessions, however, are more important than others. For example, a video chat session may be merely a generic invitation by the inviter user(s) to all of their friends of a social network (the invitee users). In such cases, some invitee users may prefer not to reject the invitation and not join the video chat session. Moreover, any invitee user that accepts the invitation and joins the video chat session may prefer to know more details about the video chat session, such as an indication of how many people are invited. Accordingly, techniques for dynamic notifications for video chat invitations are presented. These techniques can provide for an improved user video chat experience by better notifying target users of the type/importance of an incoming video chat invitation.

These dynamic notifications can include different degrees of notification. Each degree of notification can include a notification medium as well as a notification levels or intensity, each of which can have a degree of intrusiveness. Higher degrees of intrusiveness can correspond to higher degrees of notification. Examples of the notification medium include a message via the video chat application and/or a system tray, a social network stream, and email/text message. For example, a message via the video chat application may be more intrusive and thus represent a higher degree of notification compared to an email. Similarly, for example, an audible ringing may be more intrusive than a single ring/ping or a muted, visual indicator. In one implementation, the goal is for the server to provide a degree of notification that the specific invitee user would expect from the inviter user and for the specific video chat invitation. The specific notification medium and notification level for each invitee user can be determined by a server based on different information.

The degree of notification may depend on a type of invitee computing device associated with a particular invitee user. Some notifications, such as a message via the video chat application (e.g., in a web browser) may be applicable to a non-mobile (desktop) computing device and not a mobile computing device that utilizes a different operating system and applications. Another example notification is a sound command that causes the invitee computing device to play a specific type of sound (ring, jingle, beep, etc.) according to the notification (audio) level. The degree of notification can also depend on a quantity of the invitee users specified by the video chat request. A larger number of invitee users may be indicative of a less important video chat session, which can be indicative of a lesser degree of notification. The specific notification level can also depend on video chat attributes of the specific invitee user. Examples of the video chat attributes include a muted or blocked status for the inviter user, logged in/out of an account at a social network, a connection with the inviter user at the social network, and snooze or do not bother status, which could be derived from their calendar.

In one implementation, the degree of notification and, more particularly, the specific notification medium and notification level, can be determined using a predetermined hierarchy relating each of the parameters above to specific notification mediums and notification levels. For example, a table may be used that defines every possible combination of these parameters and a corresponding notification medium and notification level. After determining the appropriate degree of notification, the server can deliver the video chat invitations to invitee computing devices associated with the invitee users via the respective notification mediums. Receipt of a specific video chat invitation can cause a specific invitee computing device to notify a specific invitee user according to their determined notification level. Each invitee user can then accept or reject/ignore the invitation in light of the notification medium and notification level. In one implementation, the notification mediums/levels for each invitee user can be displayed to other users once they have joined the video chat session.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how and whether information is collected about the user and used by a content server.

Referring now to FIG. 1, a diagram of a computing network 100 is illustrated. The computing network 100 can include an example server 104 according to some implementations of the present disclosure. As used herein, the term "server" can refer to any suitable hardware computer server, as well as both a single server and multiple servers operating in a parallel or distributed architecture. The server 104 can be configured to initiate video chat sessions. An inviter user 108 can utilize the server 104 to initiate a video chat session with invitee users 112-1 . . . 112-N (N>0, collectively "invitee users 112"). The inviter user 108 can use an inviter computing device 116 to create a video chat invitation at the server 104 via a network 120. The network 120 can include a local area network (LAN), a wide area network (WAN), or a combination thereof.

The server 104 can then distribute the video chat invitation to invitee computing devices 124-1 . . . 124-N (collectively "invitee computing devices 124") associated with the invitee users 112. Examples of the inviter computing device 108 and invitee computing devices 124 include desktop computers, laptop computers, tablet computers, and mobile phones. As shown, a first invitee computing device 124-1 is a mobile computing device (e.g., a mobile phone) and a last invitee computing device 124-N is a non-mobile computing device (e.g., a desktop computer). The server 104 can also be associated with a social network, specific accounts (e.g., email), and calendars for at least some of the inviter user 108 and the invitee users 112. The server 104 can utilize all of this information to determine the appropriate notification medium and notification level for the video chat invitation for a specific invitee user 112.

Figure 2:
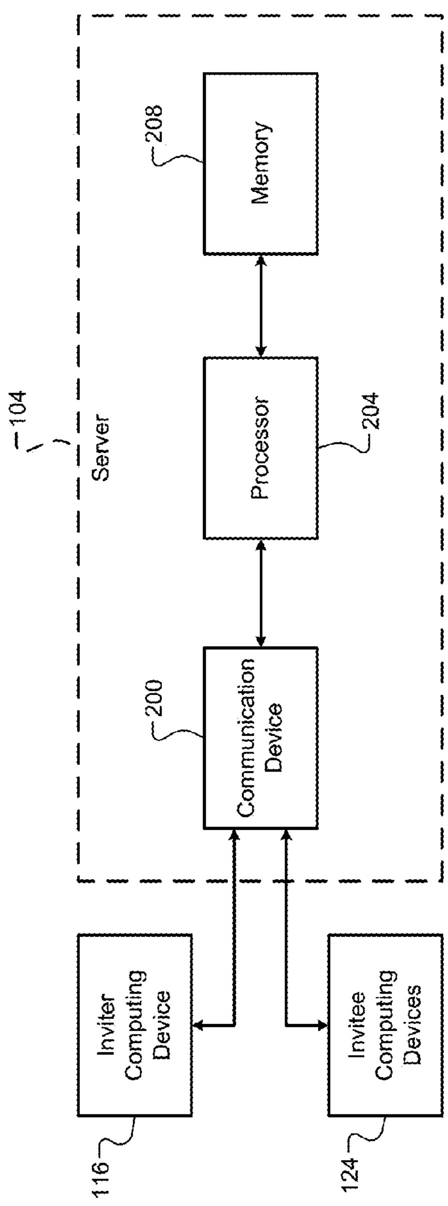
FIG. 2 is a functional block diagram of the example server of FIG. 1.

Referring now to FIG. 2, a functional block diagram of the server 104 is illustrated. The server 104 can include a communication device 200, a processor 204, and a memory 208. The term "processor" as used herein can refer to both a single processor and multiple processors operating in a parallel or distributed architecture. The communication device 200 can include any suitable communication components (e.g., a transceiver) for communication via the network 120. The memory 208 can be any suitable storage medium (flash, hard disk, etc.) for storing information at the server 104. The processor 204 can control operation of the server 104, such as performing functions including, but not limited to, controlling communication via the communication device 200 and controlling read/write operations at the memory 208. The processor can also implement at least a portion of the techniques of the present disclosure, which are described in greater detail below.

The server 104 can receive a video chat request from the inviter user 108 via the inviter computing device 116. The video chat request can specify at least one of the invitee users 112 or other users. For explanatory purposes, however, the video chat request can specify all of the invitee users 112. The video chat request may also specify other information, such as a proposed time, a topic for discussion, and the like. In response to receiving the video chat request, the server 104 can determine a degree of notification for video chat invitations for each invitee user 112. The degree of notification can include a notification medium and a notification level. The notification medium can represent a method of delivering the video chat invitation to a specific invitee computing device 124, whereas the notification level can represent how the video chat invitation is presented to a specific invitee user 112 at the specific invitee computing device 124.

The notification medium and the notification level can each have a degree of intrusiveness. The degree of intrusiveness can correspond to what a reasonable or average invitee user would find intrusive. For example, a pop-up window or a loud ringing noise may be more intrusive than an email or a muted system tray notification. In one implementation, a table can define the notification mediums and notification levels that can be used to select the appropriate notification medium and notification level for a particular invitee user 112. Something indicative of whether a level of intrusiveness is appropriate or not for a typical or average user can be referred to as a generic attribute. What is appropriate for the particular invitee user 112 (i.e., a user-specific attribute), however, can depend on their preferences as well, hereinafter referred to as video chat attributes.

One example of the generic attributes is a number of invitee users 112 specified by the video chat request. A larger number of invitee users 112 can be indicative of a less important video chat session, and thus a lesser degree of notification may be appropriate. Different user quantity thresholds may be utilized to determine the appropriate degree of notification. For example only, 0-9 users may correspond to a highest degree of notification, followed by 10-25 users, 26-100 users, and lastly 100 or more users, which may correspond to a lowest degree of notification. Another example of the generic attributes is a type of the specific invitee computing device 124. More specifically, certain notification mediums and certain notification levels may be more or less appropriate depending on the computing device type. For example only, push notifications may not be used for mobile computing devices.

Examples of the notification medium include a sound command for the specific invitee computing device 124, a message via the video chat application, a message via a system tray (or "system tray message"), a social network stream, news, or content feed, email, and text message. It should be appreciated, however, that other suitable notification mediums can be implemented. In one implementation, the degree of notification, from highest to lowest, is: (i) a sound command, (ii) a message via at least one of the video chat application and the system tray, (iii) the social network stream, (iv) at least one of an email and a text message. In other words, the direct messages may be more intrusive than a post to the social network stream, which in turn may be more intrusive than an email or text message. For example, the social network stream may be public and the email or text message may be private. In one implementation, the notification medium always includes at least the social network stream. By always utilizing the social network stream, the notification (and thus information about the video chat session) can be preserved in the future, such as for later review by the specific invitee user 112.

The notification level, on the other hand, comprises at least one of an audio level and a visual level for the specific video chat invitation. A higher degree of notification can be indicative of higher audio and visual levels. Examples of the audio notification level include mute, vibrate (mobile computing device only), and different noises, such as a single ding, a short jingle, and a full ring. In one implementation, this list of example audio notification levels is from a lowest degree of notification to a highest degree of notification. The audio notification level can further include different volume levels, where higher volumes correspond to a higher degree of notification. Examples of the video notification level include a static icon, a dynamic icon, a pop-up message, and a pop-up window. In one implementation, this list of example video notification levels is from a lowest degree of notification to a highest degree of notification. It should be appreciated, however, that any other suitable notification levels and/or combinations can be implemented.

The server 104 can determine the appropriate degree of notification (notification medium and notification level) based on the number of invitee users 112 (as previously discussed) and based further on the user-specific or video chat attributes of the specific invitee user 112. One example of the video chat attributes is a muted or blocked status for the inviter user 108. For example, the specific invitee user 112 may have muted the inviter user 108, such as via the video chat application. Alternatively, for example, the specific invitee user 112 may have blocked the inviter user 108 on the social network. This muted of blocked status can be indicative of a lesser degree of notification. Another example video chat attribute can be a logged in/out status for an account, such as an account at the social network. The logged in status can be indicative of a higher degree of notification and the logged out status can be indicative of a lesser degree of notification. Other logged in/out statuses could be implemented, such as whether the specific invitee user is logged in/out of an email account and/or another account associated with the video chat application.

Another example video chat attribute can be a connection with the inviter user 108 at the social network. The connection with the inviter user 108 can be indicative of a higher degree of notification. In other words, when the specific invitee user 112 and the inviter user 108 are friends or have some other sort of connection, the video chat invitation may be more important to the specific invitee user 112. Additionally, at least some of the video chat attributes of the specific invitee user 112 are determined using a calendar associated with the specific invitee user 112. One example video chat attribute derived from the calendar can include a snooze or do not bother status. The snooze or do not bother status can be indicative of a lesser degree of notification. For example, the specific invitee user 112 may have enabled the snooze status because they are sleeping or are otherwise away from their invitee computing device 124. Alternatively, for example, the specific invitee user 112 may have enabled the do not bother status because they are at work or otherwise do not want to be bothered by communications such as video chat invitations.

Once the server 104 has determined the degree of notification (notification medium and notification level) for each invitee user 112, the server 104 can output the video chat invitations to the invitee computing device 124 associated with the invitee users 112, respectively via their respective determined notification mediums. Upon receipt of the video chat invitations, each invitee computing device 124 can notify the corresponding invitee user 112 of the video chat session according to its respective determined notification level. Based on the notification medium and the notification level, a specific invitee user 112 may decide whether or not to join the video chat session. For example, a high degree of notification may result in a high likelihood that the specific invitee user 112 decides to join the video chat session.

Conversely, for example, a low degree of notification may result in a low likelihood that the specific invitee user 112 decides to join the video chat session, perhaps because they never noticed/acknowledged the video chat invitation. If the specific invitee user 112 does join the video chat session, they (and all other participants) may be presented with a list of participants and an indicator of each participant's degree of notification (notification medium and/or notification level). In one implementation, the participants are arranged in a list ordered from a highest degree of notification to a lowest degree of notification, and thus each participant can observe how their degree of notification compares to other participants. For example, the degree of notification may reflect a particular participant's important to the video chat session. These indicators may cause them to adjust some of their video chat attributes (e.g., unmute/unblock, change social network connections, etc.). The indicators may also cause a participant to leave the video chat session, e.g., by observing the low degrees of notifications of others or by observing their low degree of notification with respect to others.

In some implementations, the inviter user 108 can specify the notification medium and/or notification level for one or more of the video chat invitations. For example, these specified settings may override any determination by the server 104 of the degree of notification. Because the inviter user 108 is in a better position to know the importance of the video chat session, he/she may be in a better position to adjust the notification settings for the video chat invitations. In one example, the inviter user 108 can specify that at least some of the video chat invitations be delivered silently (i.e., a muted notification level) because the inviter user 108 does not want to overly bother the invitee users 112. This process, however, may be difficult and time consuming for the inviter user 108, and thus the automated approach discussed in greater detail above may be faster and more efficient and thus more desirable.

Figure 3:
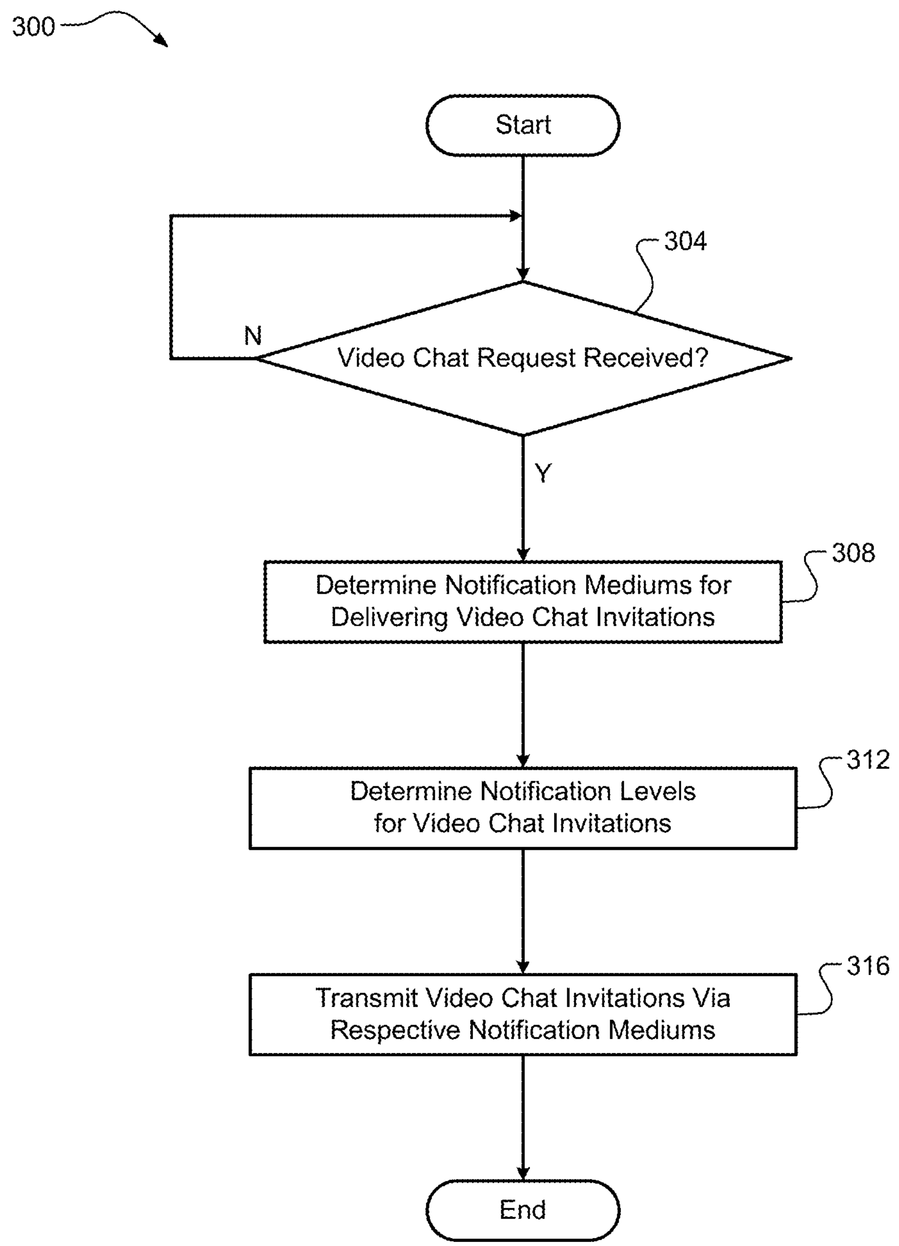
FIG. 3 is a flow diagram of an example dynamic notification technique for video chat invitations according to some implementations of the present disclosure.

Referring now to FIG. 3, a flow diagram of an example dynamic notification technique 300 for video chat invitations according to some implementations of the present disclosure is illustrated. At 304, the server 104 can determine whether a video chat request has been received from the inviter user 108 via their inviter computing device 116. When the video chat request has been received, the technique 300 can proceed to 308. When the video chat request has not been received, the technique 300 can end or return to 304. At 308, for each video chat invitation, the server 104 can determine a notification medium for delivering the video chat invitation based on (i) a type of a corresponding invitee computing device 124 for a corresponding invitee user 112, (ii) the number of invitee users 112, and (iii) video chat attributes of the corresponding invitee user 112.

Similarly, at 312, for each video chat invitation, the server 104 can determine a notification level for the video chat invitation based on (i) the type of the corresponding invitee computing device 124 for the corresponding invitee user 112, (ii) the number of invitee users 112, and (iii) video chat attributes of the corresponding invitee user 112. At 316, the server 104 can output the video chat invitations to the respective invitee computing devices 124 via the respective determined notification mediums. Receipt of the video chat invitations can cause the respective invitee computing devices 124 to notify the respective invitee users 112 according to the respective determined notification levels. This notification can include audio output, video output, or a combination thereof. The technique 300 can then end or return to 304 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms “a,” “an,” and “the” may be intended to include the plural forms as well, unless the context clearly indicates otherwise. The term “and/or” includes any and all combinations of one or more of the associated listed items. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as “processing” or “computing” or “calculating” or “determining” or “displaying” or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:

receiving, at a server from an inviter computing device associated with an inviter user, the server having one or more processors, a video chat request to initiate a video chat with at least one invitee user;

for a specific invitee user, determining, at the server, a notification medium and a notification level for a specific video chat invitation for the specific invitee user based on:

(i) a type of a specific invitee computing device associated with the specific invitee user, (ii) a comparison of a number of invitee users specified by the video chat request to thresholds corresponding to different notification mediums and levels, wherein more intrusive notification mediums and levels corresponds to a lower number of invitee users, and (iii) video chat attributes of the specific invitee user, the notification level defining at least one of audio and visual levels, wherein the video chat attributes include at least one of:

(a) a muted or blocked status for the inviter user, (b) a connection with the inviter user at a social network, (c) a logged in/out status for an account, (d) a snooze or do not bother status; and outputting, from the server, the specific video chat invitation to the specific invitee computing device via the determined notification medium, wherein receipt of the specific video chat invitation causes the specific invitee computing device to notify the specific invitee user according to the determined notification level.

2. A computer-implemented method, comprising:

receiving, at a server from an inviter computing device associated with an inviter user, the server having one or more processors, a video chat request to initiate a video chat with at least one invitee user;

for a specific invitee user, determining, at the server, a degree of notification for a specific video chat invitation for the specific invitee user, the degree of notification comprising a notification medium and a notification level each having a degree of intrusiveness, wherein determining the degree of notification is based on:

(a) a number of invitee users specified by the video chat request and thresholds for different degrees of intrusiveness, wherein a higher degree of notification corresponds to a lower number of invitee users, and (b) video chat attributes of the specific invitee user, each video chat attribute being indicative of an expected degree of notification; and outputting, from the server, the specific video chat invitation to a specific invitee computing device associated with the specific invitee user via the determined notification medium, wherein receipt of the specific video chat invitation causes the specific invitee computing device to notify the specific invitee user according to the determined notification level.

3. The computer-implemented method of claim 2, wherein the notification medium includes, from highest to lowest degree of intrusiveness, at least one of:

(i) a sound command;

(ii) a message via at least one of a video chat application and a system tray;

(iii) a social network stream; and (iv) at least one of an email and a text message.

4. The computer-implemented method of claim 3, wherein the notification medium always includes at least the social network stream.

5. The computer-implemented method of claim 2, wherein the notification level comprises at least one of an audio level and a visual level for the specific video chat invitation, and wherein a higher degree of notification is indicative of higher audio and visual levels.

6. The computer-implemented method of claim 2, wherein the video chat attributes of the specific invitee user include a muted or blocked status for the inviter user, wherein the muted of blocked status is indicative of a lesser degree of notification.

7. The computer-implemented method of claim 2, wherein the video chat attributes of the specific invitee user include a logged in/out status for an account, wherein the logged in status is indicative of a higher degree of notification and the logged out status is indicative of a lesser degree of notification.

8. The computer-implemented method of claim 2, wherein the video chat attributes of the specific invitee user include a connection with the inviter user at a social network, wherein the connection with the inviter user is indicative of a higher degree of notification.

9. The computer-implemented method of claim 2, wherein at least some of the video chat attributes of the specific invitee user are determined using a calendar associated with the specific invitee user.

10. The computer-implemented method of claim 9, wherein the video chat attributes of the specific invitee user include a snooze or do not bother status determined using the calendar associated with the specific invitee user, wherein the snooze or do not bother status is indicative of a lesser degree of notification.

11. The computer-implemented method of claim 2, wherein determining the degree of notification is based further on a type of the specific invitee computing device.

12. A server having one or more processors configured to perform operations comprising:

receiving, from an inviter computing device associated with an inviter user, a video chat request to initiate a video chat with at least one invitee user;

for a specific invitee user, determining a degree of notification for a specific video chat invitation for the specific invitee user, the degree of notification comprising a notification medium and a notification level each having a degree of intrusiveness, wherein determining the degree of notification is based on:

(a) a number of invitee users specified by the video chat request and thresholds for different degrees of intrusiveness, wherein a higher degree of notification corresponds to a lower number of invitee users, and (b) video chat attributes of the specific invitee user, each video chat attribute being indicative of an expected degree of notification; and outputting the specific video chat invitation to a specific invitee computing device associated with the specific invitee user via the determined notification medium, wherein receipt of the specific video chat invitation causes the specific invitee computing device to notify the specific invitee user according to the determined notification level.

13. The server of claim 12, wherein the notification medium includes, from highest to lowest degree of intrusiveness, at least one of:

(i) a sound command;

(ii) a message via at least one of a video chat application and a system tray;

(iii) a social network stream; and (iv) at least one of an email and a text message.

14. The server of claim 13, wherein the notification medium always includes at least the social network stream.

15. The server of claim 12, wherein the notification level comprises at least one of an audio level and a visual level for the specific video chat invitation, and wherein a higher degree of notification is indicative of higher audio and visual levels.

16. The server of claim 12, wherein the video chat attributes of the specific invitee user include a muted or blocked status for the inviter user, wherein the muted of blocked status is indicative of a lesser degree of notification.

17. The server of claim 12, wherein the video chat attributes of the specific invitee user include a logged in/out status for an account, wherein the logged in status is indicative of a higher degree of notification and the logged out status is indicative of a lesser degree of notification.

18. The server of claim 12, wherein the video chat attributes of the specific invitee user include a connection with the inviter user at a social network, wherein the connection with the inviter user is indicative of a higher degree of notification.

19. The server of claim 18, wherein at least some of the video chat attributes of the specific invitee user are determined using a calendar associated with the specific invitee user, and wherein the video chat attributes of the specific invitee user include a snooze or do not bother status determined using the calendar associated with the specific invitee user, wherein the snooze or do not bother status is indicative of a lesser degree of notification.

20. The server of claim 12, wherein determining the degree of notification is based further on a type of the specific invitee computing device.

* * * * *